United States Patent
Hirsch

[11] 3,721,320
[45] March 20, 1973

[54] ENERGY ABSORPTION APPARATUS

[76] Inventor: Joseph Hirsch, 12272 Enramada Dr., Santa Ana, Calif. 92705

[22] Filed: Aug. 26, 1972

[21] Appl. No.: 175,240

[52] U.S. Cl. .................................. 188/1 C, 293/70
[51] Int. Cl. .......................................... F16f 7/12
[58] Field of Search ............ 74/492; 188/1 C; 293/70

[56] References Cited

UNITED STATES PATENTS

| 3,097,725 | 7/1963 | Peterson | 188/1 C X |
| 3,209,864 | 10/1965 | Boyd | 188/1 C |
| 3,380,557 | 4/1968 | Peterson | 188/1 C |
| 3,398,812 | 8/1968 | Peterson | 188/1 C |

Primary Examiner—Duane A. Reger
Attorney—Richard S. Sciascia et al.

[57] ABSTRACT

An energy absorption apparatus which includes a body having a cylindrical bore; a soft ductile metallic sleeve mounted in the cylindrical bore; a cylindrical shaft mounted in the sleeve and having an enlarged hard metallic mandrel portion which is capable of drawing through the soft metallic sleeve; and a annular die mounted in the cylindrical bore and having an internal diameter which is larger than the external diameter of the cylindrical portion of the shaft but less than the external diameter of the sleeve. Upon impact loading of the shaft the mandrel draws through the soft metallic sleeve and metal of the sleeve as extruded forward of the mandrel and through the die to absorb the shock energy.

7 Claims, 4 Drawing Figures

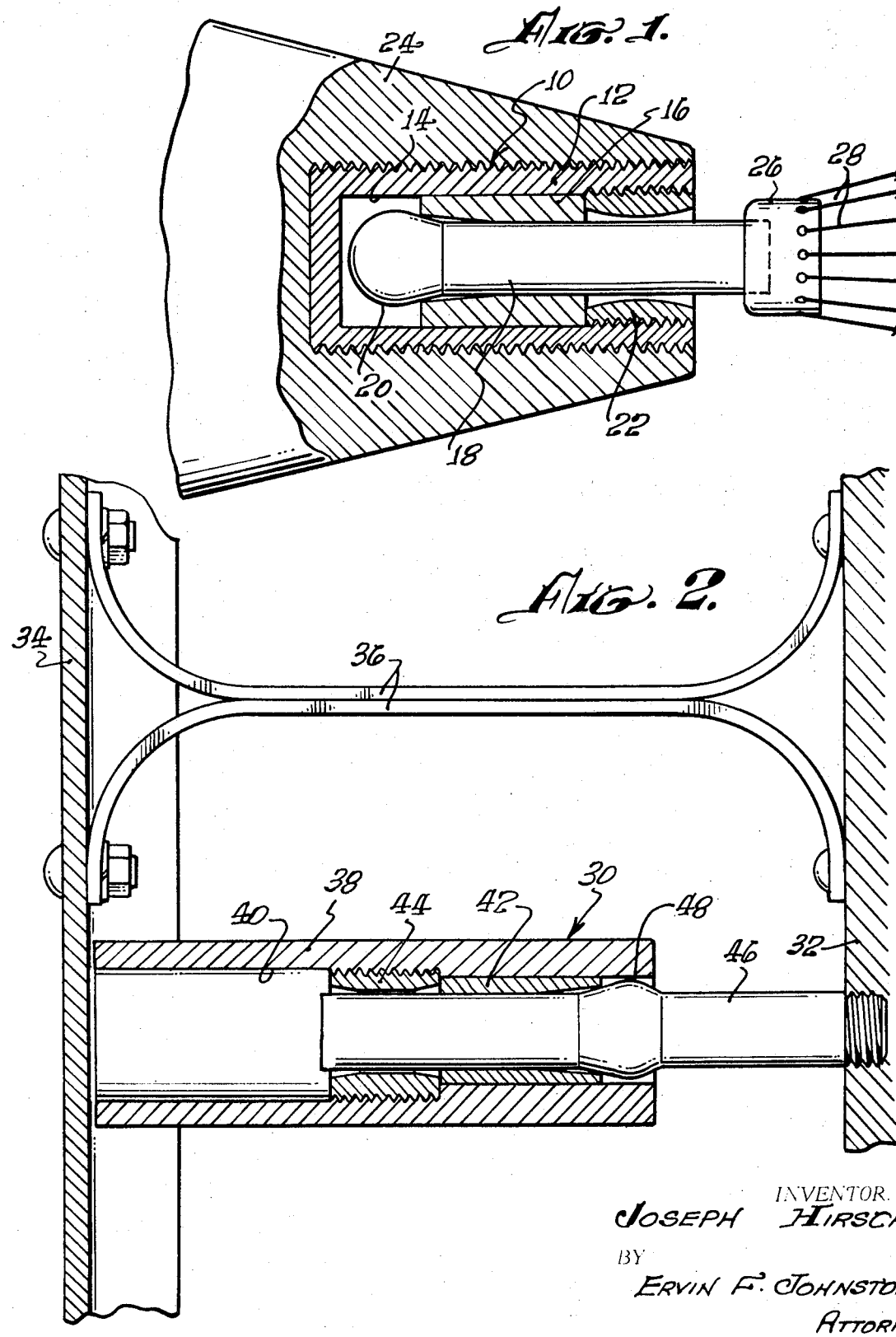

ENERGY ABSORPTION APPARATUS

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

Energy absorption is an important design consideration where impact loading endangers life or property. Areas where such a consideration becomes significant are: parachute launch of rockets; automobile bumpers; seat belts; seat frames; soft landings of spacecraft; and backup systems for aircraft landing gears. Energy absorption devices for many of these areas have taken the form of a spring or a hydraulic piston and cylinder arrangement. While these systems are effective it has been found that they are not nearly as effective as utilizing the energy absorption of metal forced to flow in its plastic region. An example of such a system is illustrated in the patent to Webb, U. S. Pat. No. 3,181,821 for a Space Craft Soft Landing System. The device of this patent forces a bulb portion of a shaft through a tube to absorb energy. The plastic flow of the tube dissipates the energy as heat and cushions the landing of the space craft. The search continues, however, for even better energy absorption systems in view of the great loss of life or property upon strong impacts.

SUMMARY OF THE INVENTION

In the patent to Webb the plastic deformation of the tube is generally lateral as the bulb portion of the shaft is drawn therethrough. It has been found that significantly improved absorption is attained when the plastic deformation is longitudinal such as along the length of a ductile sleeve. The present invention utilizes an annular die adjacent to the sleeve so that a bulb mandrel will extrude a longitudinal portion of the sleeve through the die. The invention is accomplished by utilizing a body having a cylindrical bore; a soft ductile metallic sleeve mounted in the cylindrical bore; a cylindrical shaft mounted in the sleeve and having an enlarged hard metallic mandrel portion which is capable of drawing through the soft metallic sleeve; and annular die mounted in the cylindrical bore and having an internal diameter which is larger than the external diameter of the cylindrical portion of the shaft but less than the external diameter of the sleeve. Accordingly, upon impact loading of the shaft the mandrel draws through the soft metallic sleeve and metal of the sleeve is extruded forward of the mandrel and through the die to absorb the shock energy. The invention can be easily adapted for use within any of the aforementioned areas where energy absorption is a consideration. Hereinbelow, the invention is shown utilized for absorbing energy upon the opening of a parachute attached to a warhead, such as a torpedo, and a bumper connected to an automobile frame.

STATEMENT OF THE OBJECTS OF THE INVENTION

An object of the present invention is to provide an improved and more efficient energy absorption apparatus which utilizes the plastic flow of metal.

Another object is to provide an energy absorption apparatus which maximizes the longitudinal plastic flow of a ductile sleeve.

A further object is to provide an energy absorption apparatus which is usable with parachute retardation of a warhead.

Still another object is to provide an energy absorption apparatus which is usable with a bumper and automobile frame.

Other objects and many of the attendant advantages of this invention will be readily appreciated as it becomes better understood by reference to the description and accompanying drawings which follow.

BRIEF DESCRIPTION OF THE DRAWINGS

FIG. 1 is a side illustration of an energy absorption apparatus connected to the tail end of a torpedo and a retarding parachute with portions cut away and in cross section to illustration various details thereof;

FIG. 2 is a top illustration of an energy absorption apparatus in combination with a bumper and automobile frame with portions cut away and in cross section to illustrate various details thereof;

DESCRIPTION OF THE PREFERRED EMBODIMENTS

Figure 3:
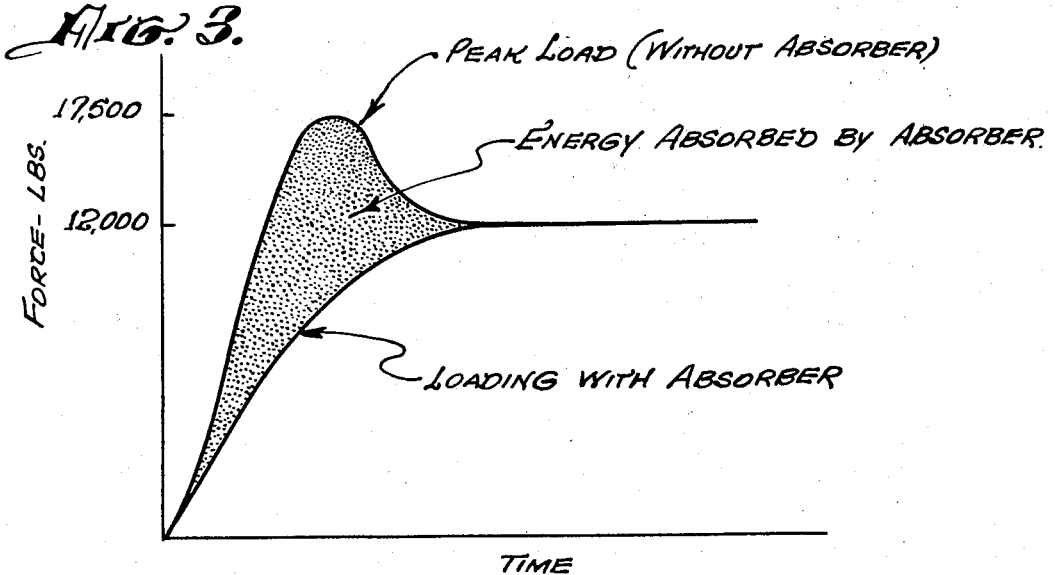
FIG. 3 illustrates the force-time history of a shock loading curve with and without the energy absorber.

Referring now to the drawing wherein like reference numerals designate like or similar parts throughout the several views there is shown in FIG. 1 an energy absorption apparatus 10 which includes a body 12 which has a cylindrical bore 14. A soft ductile metallic sleeve 16 is mounted in the cylindrical bore 14, and a cylindrical shaft 18 is slidably mounted in the sleeve 16 and has an enlarged hard metallic mandrel portion 20 which is capable of drawing through the soft metallic sleeve. An annular die 22 is mounted in the cylindrical bore 14 and has an internal diameter which is larger than the external diameter of the cylindrical portion of the shaft but less than the external diameter of the sleeve 16. With such an arrangement impact loading of the shaft 18 to the right in FIG. 1 causes the mandrel 20 to draw through the soft metallic sleeve 16 so that metal of the sleeve is extruded forward of the mandrel and through the die 22 to absorb the shock energy.

A significant advantage of the invention is that as the mandrel 20 commences to draw through the sleeve 16 a longitudinal circular or tubelike portion of the sleeve 16 between the mandrel 20 and the die 22 moves to the right and is extruded through the die 22 between the die 22 and the exterior surface of the shaft 18. In spite of the relatively small size of the sleeve 16 a tremendous amount of energy is absorbed and converted to heat by moving a substantially internal tubular portion of the sleeve in its plastic region through the die 22. This desirable result is enhanced by slightly internally tapering the sleeve from an smaller diameter to a larger diameter toward the mandrel 20. In this way the mass of the internal portion of the sleeve 16 moves more nearly as a single body of material toward the die 22 upon impact. During this phase material of the sleeve 16 will pile up in front of the mandrel 20 to act as a solid pushing mass. Simultaneously, material is extruded through the die 22. It has been found that the best results are achieved when the annular die 22 is curved across its internal surface, as illustrated in FIG. 1, and the mandrel 20 is bulb shaped.

In the embodiment shown in FIG. 1, the annular die 22 may be mounted adjacent the open end of the cylindrical bore 14, and one end of the sleeve 16 may be adjacent to the die, and the other end of the sleeve may be adjacent to the mandrel end 20 of the shaft. The position of the die in the cylindrical bore can vary, as will be explained in describing the next embodiment, and the mandrel 20 could be spaced from the end of the sleeve 16, however, this mandrel would then have to travel to the sleeve before the absorber would commence its operation. In the embodiment of FIG. 1 the body 12 may be threaded within the aft end of a warhead, such as a torpedo 24, and the shaft 18 may extend from the body 12 and be threaded to a ring 26 which retains shroud lines 28 of a parachute (not shown).

Figure 4:
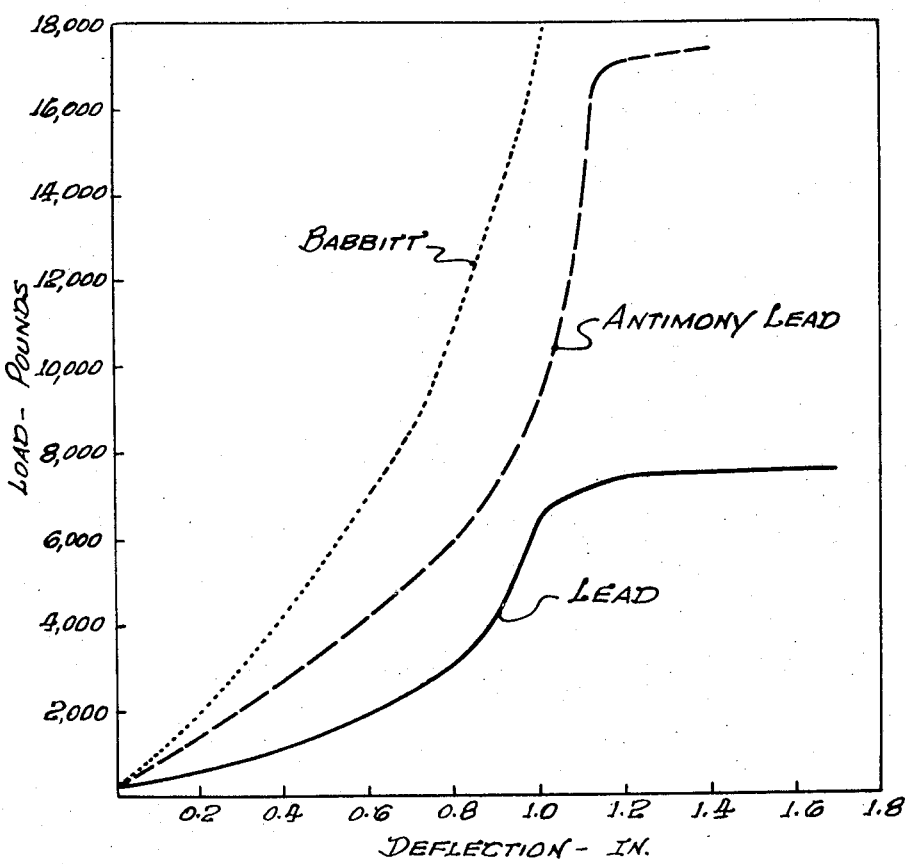
FIG. 4 illustrates load deflection curves three different metals utilized for the ductile sleeve of the present energy absorption apparatus.

In the particular embodiment of FIG. 1 the torpedo 24 weighed about 800 lbs and proceeded at a speed of 400 knots when the parachute package was deployed. The peak parachute snatch force was estimated to be about 17,500 lbs and it was desired to absorb this peak load down to a steady state value of approximately 12,000 lbs. FIG. 3 illustrates the peak load which would have to be absorbed by the torpedo without an energy absorber as compared to the curve which illustrates a leveling off of the load to a steady state value of 12,000 lbs. The energy absorbed by the absorption apparatus would be the area between these two curves. In order to meet these desired results the die 22 and the bulb portion 20 of the shaft were constructed of steel and the sleeve 16 was constructed of soft lead (corroding lead). Babbitt or Antimony lead can also be used as the soft ductile material of the sleeve 16, however, these results are not as satisfactory as that of pure lead. A comparison of these results are illustrated in FIG. 4. The dimensions of the components utilized in the embodiment of FIG. 1 were as follows: The external diameter of the sleeve 16 was 1.240 inch and the taper of the sleeve was from a small diameter of 0.766 inch up to 1.093 inch; the largest external diameter of the bulb 20 was 1.125 inch and the diameter of the cylindrical shaft 18 was 0.750 inch; inches; and the smallest internal diameter of the die 22 was 0.875 inch.

In the embodiment of FIG. 2 an energy absorber 30, which is similar to the absorber 10 of FIG. 1, is connected to an automobile frame 32 for absorbing shock impact loading to a bumper 34. The bumper 34 may be connected to the frame 32 by the normal spring means 36. The absorber 30 has a body, which may be a tube 38 which has a counterbore 40 and is located at one end adjacent to the interior surface of the bumper 34. Disposed within the central bore of the tube 38 is a soft metallic sleeve 42 and adjacent to this sleeve within the counterbore of the tube 38 is a die 44. A shaft 46 is slidably mounted within the sleeve 42 and may extend beyond the tube 38 for a threaded connection with the frame 32 so as to support the energy absorber 30 in the position illustrated. The shaft 46 has an enlarged mandrel bulb portion 48 adjacent the end of the sleeve 42 so that upon impact loading of the bumper 34 the tube 38 is driven to the right so as to cause the bulb 48 to draw through the sleeve 42 and extrude the soft ductile metal thereof through the die 44. In this manner peak loading due to collision of the automobile will be lowered to a more safe state.

It is now readily apparent that the present invention provides a highly unique concept of absorbing energy. Peak loading is eliminated and a steady loading is accomplished where energy is dissipated as heat by plastic flow of a tube along its length. This novel concept has many other applications other than that described hereinabove, such as seat belts, seat frames, soft landings of spacecraft, and backup systems for aircraft landing gears.

Obvious many modifications and variations of the present invention are possible in the light of the above teachings. It is therefore to be understood that within the scope of the appended claims the invention may be practiced otherwise than as specifically described.

I claim:

1. An energy absorption apparatus comprising:
   a body having a cylindrical bore;
   a soft ductile metallic sleeve slidably mounted in said cylindrical bore so as to be insertable therein or removable therefrom;
   a cylindrical shaft slidably mounted in the sleeve and having an enlarged hard metallic mandrel portion which is capable of drawing through the soft metallic sleeve; and
   an annular die mounted in the cylindrical bore and having an internal diameter which is larger than the external diameter of the cylindrical portion of the shaft but less than the external diameter of the sleeve;
   whereby upon impact loading of the shaft the mandrel draws through the soft metallic sleeve, and metal of the sleeve is extruded forward of the mandrel and through the die to absorb the shock energy 2. An apparatus as claimed in claim 1 including:
   said annular die being mounted adjacent an open end of the cylindrical bore; and
   one end of the sleeve being adjacent the die and the other end of the sleeve being adjacent the enlarged mandrel end of the shaft.

3. An apparatus as claimed in claim 1 including:
   said die and the mandrel portion of the shaft being constructed of steel and
   said sleeve being constructed of lead.

4. An apparatus as claimed in claim 1 including:
   said mandrel end being bulb shaped;
   said sleeve being internally tapered from a larger diameter to a smaller diameter away from the mandrel; and
   said annular die being curved across its internal surface.

5. An apparatus as claimed in claim 4 including:
   said annular die being mounted adjacent an open end of the cylindrical bore; and
   one end of the sleeve being adjustment the die and the other end of the sleeve being adjacent the enlarged mandrel end of the shaft.

6. An apparatus as claimed in claim 5 including:

said die and bulb portion of the shaft being constructed of steel and said sleeve being constructed of lead.

7. An apparatus as claimed in claim 6 including:

said die being threaded into the body within said cylindrical bore.

* * * * *